US010906491B2

(12) United States Patent
Lung et al.

(10) Patent No.: US 10,906,491 B2
(45) Date of Patent: Feb. 2, 2021

(54) SAFETY AND COMFORT RESTRAINING DEVICE FOR A VEHICLE OCCUPANT AND METHOD FOR OPERATING SAID DEVICE

(71) Applicant: Bayerische Motoren Werke Aktiengesellschaft, Munich (DE)

(72) Inventors: Claudia Lung, Munich (DE); Maik Schwalm, Munich (DE); Izabella Ferenczi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 230 days.

(21) Appl. No.: 15/794,129

(22) Filed: Oct. 26, 2017

(65) Prior Publication Data

US 2018/0043851 A1 Feb. 15, 2018

Related U.S. Application Data

(63) Continuation of application No. PCT/EP2016/059192, filed on Apr. 25, 2016.

(30) Foreign Application Priority Data

Apr. 27, 2015 (DE) .......................... 10 2015 207 649

(51) Int. Cl.
*B60R 21/0132* (2006.01)
*B60R 21/18* (2006.01)
(Continued)

(52) U.S. Cl.
CPC .......... *B60R 21/0132* (2013.01); *B60R 21/18* (2013.01); *B60R 22/12* (2013.01);
(Continued)

(58) Field of Classification Search
CPC ...................................................... B60R 21/18
See application file for complete search history.

(56) References Cited

U.S. PATENT DOCUMENTS 3,841,654 A 10/1974 Lewis
5,333,902 A * 8/1994 Hatfield .................. B60R 21/18
280/733

(Continued)

FOREIGN PATENT DOCUMENTS

DE 43 05 291 A1 9/1993
DE 43 05 505 A1 9/1993
(Continued)

OTHER PUBLICATIONS

International Search Report (PCT/ISA/210) issued in PCT Application No. PCT/EP2016/059192 dated Jul. 14, 2016 with English translation (six (6) pages).
(Continued)

*Primary Examiner* — Jess Whittington
(74) *Attorney, Agent, or Firm* — Crowell & Moring LLP

(57) ABSTRACT

A restraining device is provided to improve the safety and comfort of a vehicle occupant. The restraining device has a safety belt and an airbag device arranged on the safety belt, which airbag device has a first airbag, which is arranged on the side of the safety belt facing the vehicle occupant, and a second airbag, which is arranged on the side of the safety belt facing away from the vehicle occupant. The first airbag and/or the second airbag can be filled with air and/or can be emptied. A method for operating the restraining device controls the filling state of the first airbag and of the second airbag in an open-loop and/or closed-loop manner in accordance with the state of the motor vehicle provided with the restraining device.

16 Claims, 6 Drawing Sheets

(51) Int. Cl.
*B60R 22/12* (2006.01)
*B60R 21/16* (2006.01)
*B60R 21/0134* (2006.01)

(52) U.S. Cl.
CPC ............... *B60R 2021/01345* (2013.01); *B60R 2021/165* (2013.01)

(56) References Cited

U.S. PATENT DOCUMENTS

| | | | |
|---|---|---|---|
| 5,597,179 A * | 1/1997 | Kornhauser | B60R 21/02 280/735 |
| 5,607,180 A * | 3/1997 | Kornhauser | B60R 21/02 280/736 |
| 6,142,511 A | 11/2000 | Lewis | |
| 8,678,511 B2 * | 3/2014 | Grover | B60R 21/18 297/482 |
| 2006/0108854 A1 | 5/2006 | Lo | |
| 2006/0217643 A1 * | 9/2006 | Yonekawa | A61H 9/0078 601/148 |
| 2008/0201042 A1 * | 8/2008 | Cuddihy | B60R 21/0134 701/45 |
| 2010/0201108 A1 * | 8/2010 | Iwayama | B60R 21/2338 280/730.2 |
| 2012/0193957 A1 * | 8/2012 | Grover | B60R 22/14 297/219.1 |
| 2013/0313811 A1 * | 11/2013 | Ichida | B60R 21/18 280/733 |
| 2015/0105982 A1 * | 4/2015 | Okamura | B60R 21/0132 701/45 |
| 2015/0123838 A1 * | 5/2015 | Shi | H01Q 21/0075 342/70 |
| 2015/0259071 A1 * | 9/2015 | Santana-Gallego | B64D 11/062 244/121 |
| 2016/0082912 A1 * | 3/2016 | Yoon | G01S 17/931 701/45 |

FOREIGN PATENT DOCUMENTS

| | | |
|---|---|---|
| DE | 44 26 090 A1 | 7/1995 |
| DE | 102 48 853 A1 | 5/2004 |
| DE | 103 19 953 A1 | 8/2005 |
| DE | 10 2007 013 105 A1 | 9/2008 |
| EP | 1 457 390 A1 | 9/2004 |
| EP | 1 616 760 A1 | 1/2006 |
| WO | WO 88/07947 A1 | 10/1988 |
| WO | WO 2008/110448 A1 | 9/2008 |
| WO | WO 2009/117008 A1 | 9/2009 |

OTHER PUBLICATIONS

German-language Search Report issued in counterpart German Application No. 10 2015 207 649.0 dated Jan. 27, 2016 with partial English translation (thirteen (13) pages).

German-language Written Opinion (PCT/ISA/210) issued in PCT Application No. PCT/EP2016/059192 dated Apr. 25, 2016 (six (6) pages).

* cited by examiner

SAFETY AND COMFORT RESTRAINING DEVICE FOR A VEHICLE OCCUPANT AND METHOD FOR OPERATING SAID DEVICE

CROSS REFERENCE TO RELATED APPLICATIONS

This application is a continuation of PCT International Application No. PCT/EP2016/059192, filed Apr. 25, 2016, which claims priority under 35 U.S.C. § 119 from German Patent Application No. 10 2015 207 649.0, filed Apr. 27, 2015, the entire disclosures of which are herein expressly incorporated by reference.

BACKGROUND AND SUMMARY OF THE INVENTION

The present invention relates to a safety and comfort restraint device for a vehicle occupant. The present invention further relates to a method for operating a restraint device of this kind.

Safety restraint devices for occupants of a motor vehicle comprising an airbag which is arranged on a safety belt have long been known. For example, U.S. Pat. No. 3,841,654 describes a safety belt which is inflated in the event of an accident and bears against the shoulder, neck and pelvis region of a vehicle occupant. In order to inflate the airbag as quickly as possible, a pyrotechnically operated gas source, that is to say a gas generator, a gas storage tank or a combination of the two, is provided according to said document. More recent documents, such as U.S. Pat. No. 6,142,511, EP 1 457 390 A1 (which makes direct reference to U.S. Pat. No. 3,841,654), and WO 2009/117008 A for example, disclose possible ways in which the gas which is generated by means of a gas generator can flow into the airbag as quickly as possible. In each of the devices known from the prior art, the gas is generated only in the event of an accident. Repeatable or repeated triggering of the airbag is neither provided nor possible in said devices. The airbag itself is irreversibly filled with the gas, so that at least the associated airbag cartridge has to be replaced after the accident, this being disadvantageous. These devices which are known from the prior art have the further disadvantage that protection of the vehicle occupant in the event of a pre-crash, that is to say when there is a threat of an accident occuring, in particular a collision, but said accident or collision has not actually occurred, is not taken into consideration.

DE 10 2007 013 105 A1 discloses a safety belt comprising an airbag which is arranged next to a vehicle occupant and is intended to protect the vehicle occupant in the event of a pre-crash. In actual fact, DE 10 2007 013 105 A1 provides that the airbag, which is of reversible design, can be arranged between a side vehicle door and the vehicle occupant such that only the pelvis region of the vehicle occupant is protected; protection of other areas of the body cannot be inferred from this document.

All of these restraint devices, which are known from the prior art, are additionally characterized in that they take into account the safety of the vehicle occupant, but not the comfort of the vehicle occupant.

The object of the present invention is to provide a restraint apparatus for a vehicle occupant which overcomes the abovementioned disadvantages.

This and other objects are achieved by a restraint apparatus for a vehicle occupant, comprising a safety belt and an airbag device which is arranged on the safety belt. In the restraint apparatus the airbag device has a first airbag, which is arranged on that side of the safety belt which faces the vehicle occupant, and a second airbag, which is arranged on that side of the safety belt facing away from the vehicle occupant, wherein the first airbag and/or the second airbag is designed such that they can be filled with air or can be emptied.

According to the invention, it is provided that that airbag which faces the vehicle occupant serves primarily for the safety of the vehicle occupant, and that airbag which faces away from the vehicle occupant serves primarily for the comfort of the vehicle occupant. As a result, both the safety and the comfort of the vehicle occupant are improved in an advantageous manner. Both airbags can be reversibly filled with air, that is to say by means of ambient air and not with a gas which is generated by way of a gas generator. As a result, the restraint device according to the invention can advantageously be used several times, in particular many times, without it being necessary to replace components which make up this device. Therefore, use of the restraint device in the event of a pre-crash is additionally possible in principle, this further improving the safety of the vehicle occupant.

In a further refinement of the invention, a first fan is fluidically connected to the first airbag, and a second fan is fluidically connected to the second airbag. As a result, it is possible to fill each airbag individually or both airbags at the same time using simple and proven means. Furthermore, it can advantageously be provided to empty each airbag using the first and, respectively, the second fan.

A simplified construction of the restraint device according to the invention is achieved when the first airbag and the second airbag are fluidically connected to a common fan.

In order to further simplify the filling and, respectively, the emptying process, a valve device is advantageously provided for selectively filling or emptying the first airbag and the second airbag.

In order to simplify advantageous reliable and rapid filling of the restraint device according to the invention in the event of a pre-crash, it can be provided that the first airbag and/or the second airbag are or is coupled to a pre-crash sensor or a corresponding evaluation unit. A pre-crash sensor of this kind, together with the associated evaluation unit, can include, in particular, suitable in-vehicle detection devices, an image recording system, a radar system or the like.

The second airbag can be operated by way of a manual pushbutton which can be operated by the vehicle occupant and is coupled to the second fan. As a result, the second airbag can be entirely or partially filled with air or emptied in accordance with the wishes of the vehicle occupant. This advantageously improves the comfort of the restraint device according to the invention.

In order to further simplify the technical design of the restraint device according to the invention, it can be provided to arrange the fan which is provided for filling and, respectively, emptying the first airbag and/or the second airbag on a belt retractor which guides the safety belt, on an end fitting which holds the safety belt and/or on a buckle which holds and, respectively, releases the safety belt.

According to the invention, the first airbag and the second airbag are arranged on the safety belt. This means that the two airbags are located on the safety belt and are fastened to the safety belt in any desired manner. In particular, it can advantageously be provided that the first airbag and/or the second airbag can be permanently fastened to, for example sewn onto, the safety belt or can be removable, for example by way of a hook-and-loop fastener. As an alternative, the first airbag and/or the second airbag can be integrally formed with the safety belt, and therefore a visually particularly pleasing refinement of the restraint device according to the invention is advantageously achieved.

In the restraint device, it can be provided that the first airbag and/or the second airbag are or is arranged in the region of a shoulder and/or the chest of a vehicle occupant. As a result, safety and comfort of the vehicle occupant are further improved.

This is particularly the case when the first airbag has a thickness of substantially 25 mm and the second airbag has a thickness of substantially 150 mm in the filled state. The first airbag and the second airbag can furthermore have identical or different lengths and/or widths according to the invention.

The abovementioned object is likewise achieved by a method for operating the restraint device presented above. The method according to the invention comprises the following steps:

1. Checking whether a motor vehicle which is provided with the restraint device is in a normal state.
   1.1. If said motor vehicle is in a normal state, checking whether there is a comfort request signal, an emptying request signal or a safety belt release signal.
      1.1.1. If there is a comfort request signal, filling the second airbag until there is no longer a comfort request signal.
      1.1.2. If there is an emptying request signal, emptying the second airbag until there is no longer an emptying request signal.
      1.1.3. If there is a safety belt release signal, emptying the second airbag completely.
   1.2. If there is no normal state, checking whether there is a pre-crash signal.
      1.2.1. If there is a pre-crash signal, filling the first airbag completely.
      1.2.2. If there is no pre-crash signal, checking whether there is an accident signal.
         1.2.2.1. If there is an accident signal, emptying the second airbag completely.
         1.2.2.2. If there is no accident signal, outputting an error message.

The abovementioned comfort request signal is generated, in particular, when a vehicle occupant operates a pushbutton in order to allow an airbag, preferably the second airbag, to be filled with air. The abovementioned emptying request signal is generated, in particular, when a vehicle occupant operates a pushbutton in order to entirely or partially empty an airbag, preferably the second airbag. A safety belt release signal is generated, in particular, when a vehicle occupant wishes to release the safety belt, that is to say in particular when he pushes a release pushbutton which is arranged on a belt buckle, or the like. A pre-crash signal is generated, in particular, when a suitable sensor apparatus senses the threat of an accident, in particular a collision. An accident signal is generated, in particular, when a suitable sensor apparatus which may be identical to the sensor apparatus for ascertaining a pre-crash, senses the vehicle is involved in an accident.

It should be noted that filling of the second airbag can also be provided in step 1.2.1.

As is clear to see, the method according to the invention advantageously provides the option of manual, semiautomatic or automatic operation of the first airbag and/or of the second airbag. In particular, it is possible to manually operate the second airbag when the motor vehicle is in the normal state, in order to further increase the comfort of the vehicle occupant. Secondly, the second airbag can be automatically emptied when the vehicle occupant wishes to unbuckle. Furthermore, it is possible to allow the two airbags to be automatically filled in the event of a pre-crash and/or in the event of an accident, this leading to increased safety of the vehicle occupant. Finally, fault diagnosis of the restraint device according to the invention can advantageously be carried out with the aid of the method according to the invention.

The above-described features of the present invention can be combined with one another if possible, even if the combination is not explicitly described above.

Other objects, advantages and novel features of the present invention will become apparent from the following detailed description of one or more preferred embodiments when considered in conjunction with the accompanying drawings.

DETAILED DESCRIPTION OF THE DRAWINGS

With reference to FIGS. 1 to 3B, a detailed, non-prejudicial, in particular non-restrictive, description of an exemplary embodiment of the present invention is provided. Identical elements are provided with the same reference symbols, unless stated otherwise.

Figure 1:
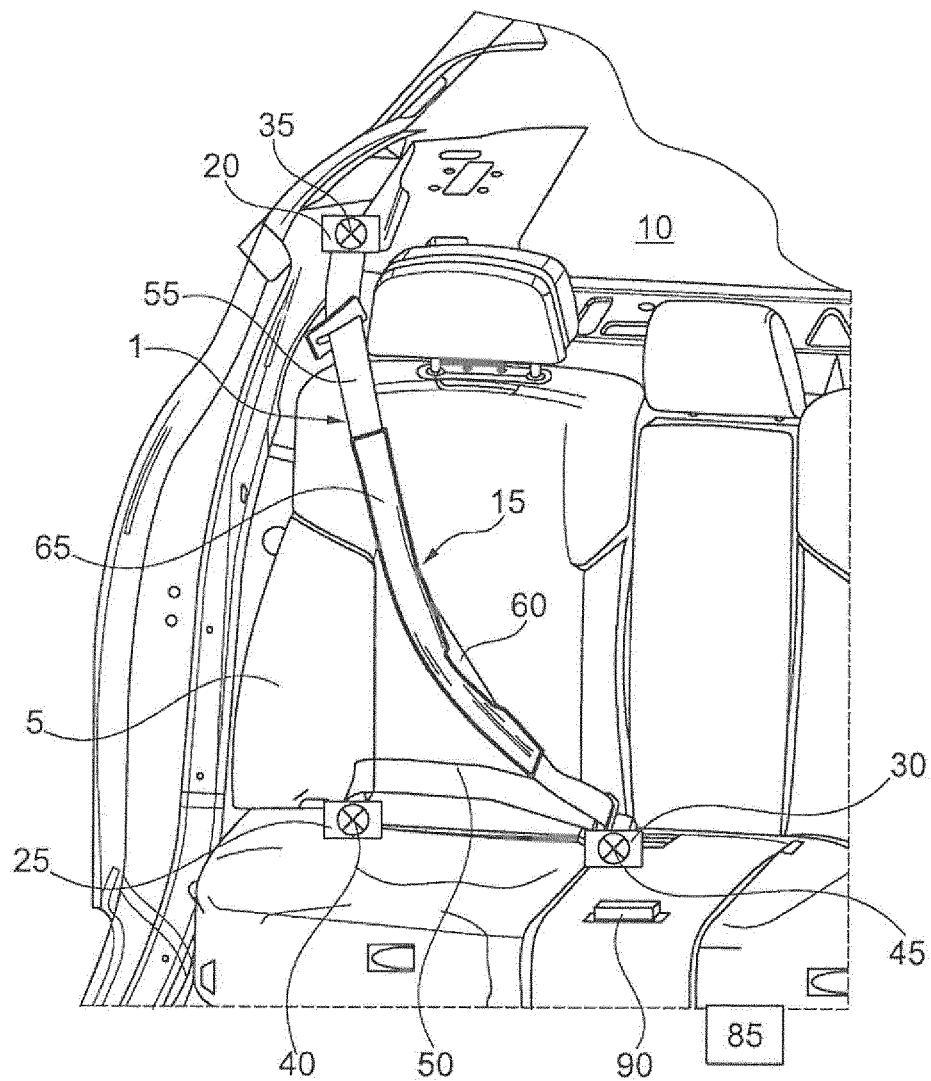
FIG. 1 is a perspective plan view of a restraint device according to an embodiment of the invention in a motor vehicle.

FIG. 1 shows a perspective plan view of a restraint apparatus 1 according to an embodiment the invention. The restraint apparatus 1 is located on a vehicle seat 5 of a motor vehicle 10. The restraint apparatus has a safety belt 15, that end of said safety belt which is shown at the top in FIG. 1 being fastened to a belt retractor 20 and the two lower ends shown in FIG. 1 being fastened to an end fitting 25 and, respectively, to a buckle 30. According to the invention, a fan 35 can be provided on the seatbelt 15, a fan 40 can be provided on the belt retractor 20 and/or a fan 45 can be provided on the end fitting 25. However, this is not compulsory; instead, a single fan for the entire restraint device 1 can also be provided according to the invention.

The safety belt 15 shown in this exemplary embodiment is, as a so-called three-point belt, equipped with a lower belt 50, which is located between the end fitting 25 and the buckle 30, and also an upper belt 55 which is located between the buckle 30 and the belt retractor 20. A first airbag 60 and a second airbag 65 are arranged on the upper belt 25. The first airbag 60 is located on that side of the restraint apparatus 1 which faces a vehicle occupant 70 (cf. FIGS. 2A to 2C). The second airbag 65 is located on the opposite side of the upper belt 55, that is to say on that side which faces away from the vehicle occupant 70. The two airbags 60 and, respectively, 65, which are part of an airbag device 57, are each fluidically connected as required to the fans 35, 40 and/or 45 which are provided on the restraint apparatus 1. This means that, if only one fan 35 is provided on the belt retractor 20, the first airbag 60 and the second airbag 65 can be filled with ambient air solely by said fan 35. As an alternative, it is possible to fill the first airbag 60 with air by a fan which is different from another fan by way of which the second airbag 65 can be filled.

The safety belt 15 which is provided on the restraint direction 1 can be integrally formed with the first airbag 60 and the second airbag 65. The first airbag 60 preferably has a length of substantially 500 mm, a width of substantially 55 mm and a depth of substantially 25 mm in such a way that it takes up a volume of substantially 0.7 to 1 liter in the state in which it is completely filled with ambient air. This volume is preferably fed in by one, several, or all of the fans 35, 40 and 45 within preferably 0.1 to 0.5 seconds in the event of a pre-crash.

In contrast, the second airbag 65 has a length of substantially 400 mm, a width of substantially 150 mm and a depth of substantially 150 mm in such a way that its volume is substantially 9 to 10 liters in the state in which it is completely filled. In this case, the second airbag 65 is configured as an elongate bladder. However, this is not compulsory; instead, any other desired shape which is beneficial for the comfort of the vehicle occupant 70 can also be provided. According to the invention, it can be provided that the first airbag 60 and/or the second airbag 65 are or is arranged in the region of a shoulder 75 and/or the chest 80 of a vehicle occupant 70 (cf. FIGS. 2A to 2C).

The first airbag 60 can be filled automatically when a signal which is sensed by a pre-crash sensor 85 actuates the fan which is provided on the restraint apparatus 1 by way of an evaluation unit (airbag controller), not illustrated here.

It is likewise possible to output a signal to the corresponding fan by the airbag controller when the air is intended to be drawn out of the first airbag 60 again after, in particular, one second.

The second airbag 65 can likewise be filled with the aid of an automatic apparatus, not illustrated further, or else manually by means of an input apparatus 90. The input apparatus 90 can be a pushbutton, an operator control button, a touchscreen or optical identification apparatus, as is known per se from the prior art. Therefore, it is possible, for example, for the vehicle occupant 70 to start up the provided fan or fans 35, 40, 45 by pressing or releasing an input device 90 which is in the form of a pushbutton and keeping it operated until the vehicle occupant releases the button of the input device 90. It is likewise possible for the vehicle occupant 70 to draw out the air which is located in the second airbag 65 by virtue of the fan or fans 35, 40, 45 in this way. According to the invention, it is therefore possible for the vehicle occupant 70 and/or an automatic evaluation unit to switch the restraint device 1 according to the invention from a belt function position, in which neither the first airbag 60 nor the second airbag 65 are entirely or partially filled with air, to a comfort function position, in which the second airbag 65 is preferably entirely or partially filled with ambient air in accordance with the wishes of the vehicle occupant 70, or a safety position, in which the first airbag 60 is completely filled and the second airbag is completely emptied. It should be noted that the first airbag 60 can also be manually filled with air or emptied by the vehicle occupant 70, without departing from the spirit of this invention.

Figure 2A:
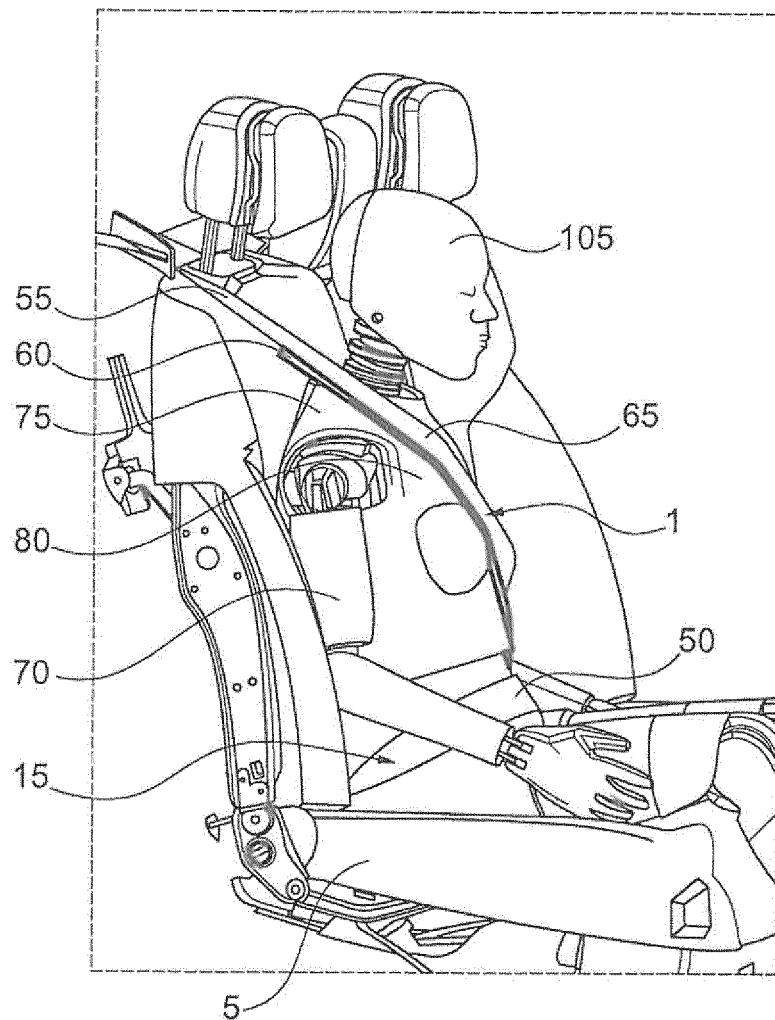
FIG. 2A is a perspective side view of a restraint device according to an embodiment of the invention in the belt function position.

In FIG. 2A, a partially illustrated vehicle occupant 70 is located on a vehicle seat 5. The vehicle occupant has placed the upper belt 55 comprising the first airbag 60 and the second airbag 65 of the restraint apparatus 1 according to the invention over his shoulder 75 and chest 80. The restraint apparatus 1 is located in the belt function position. That is to say, the two airbags 60 and 65 are emptied.

Figure 2B:
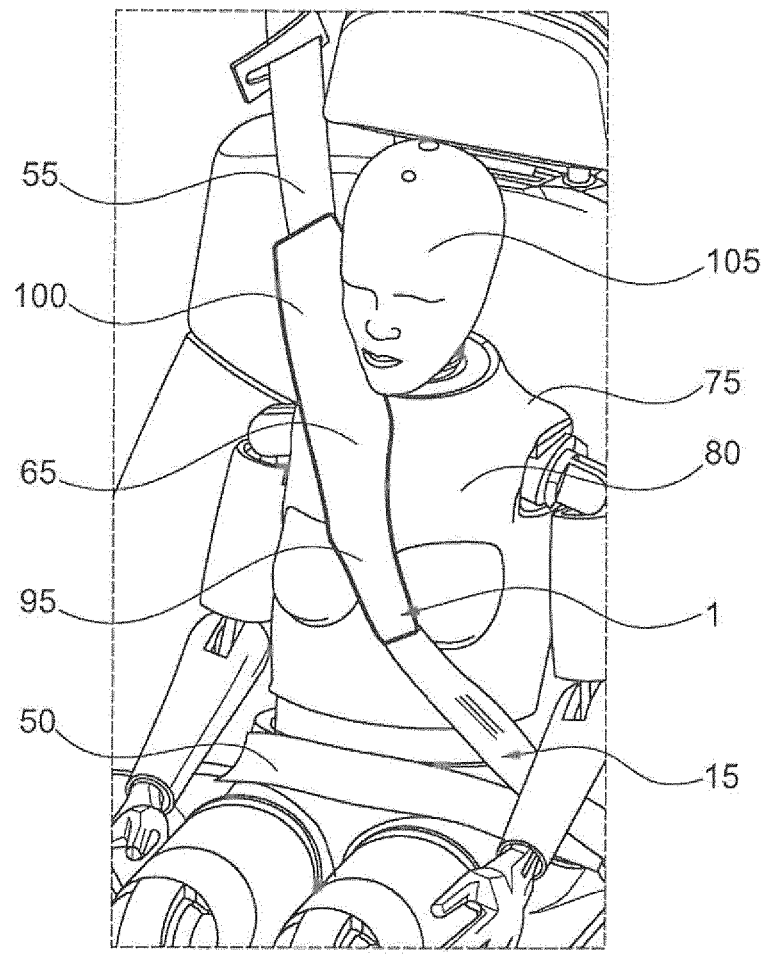
FIG. 2B shows a perspective plan view of the restraint device illustrated in FIG. 2A in the comfort function position.

The second airbag 65 can be filled with air at the request of the vehicle occupant 70, so that the second airbag assumes a comfort function position illustrated in FIG. 2B. The second airbag 65 shown in this exemplary embodiment has a substantially elongate, first section 95 which is located in the region of the chest 80 and also has a second section 100 which is located in the region of the shoulder 75 and is wider than the first section 95, so that the vehicle occupant can place his head 105 against the second section 100. The surface of the second section 100 which rests, in particular, against the head 105 can be formed from a particularly comfortable, in particular soft, and/or hygienic material in this case.

Figure 2C:
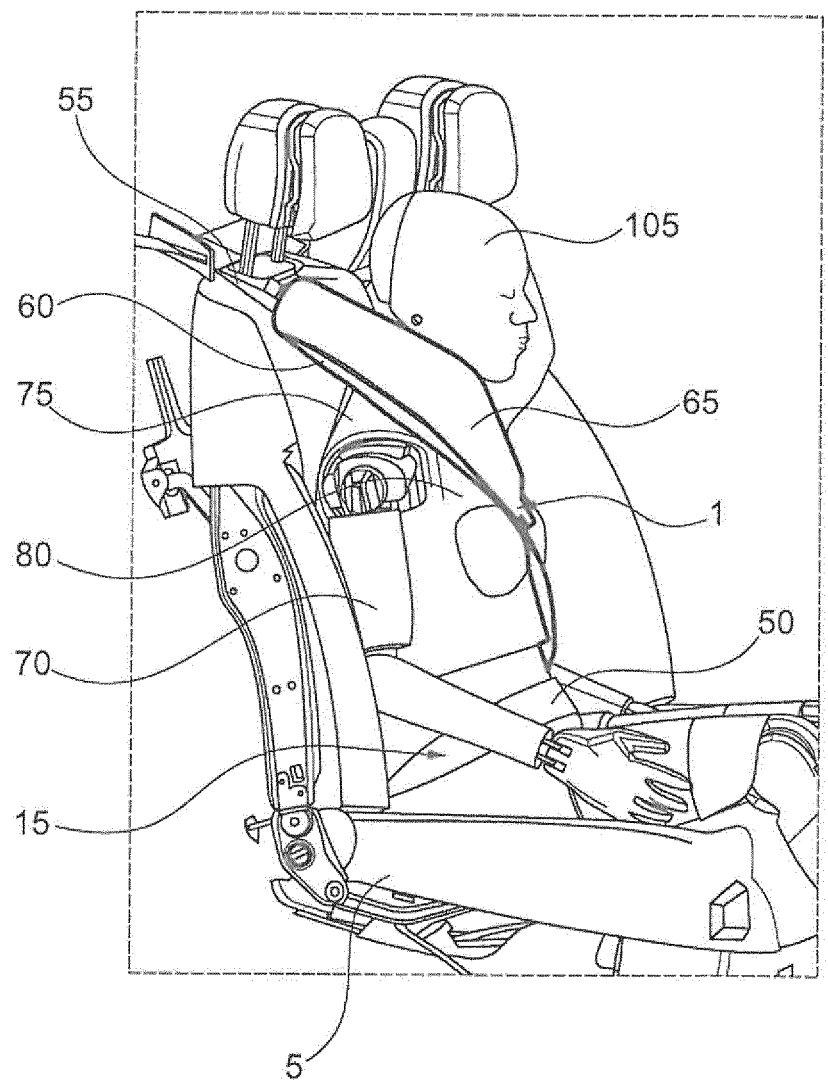
FIG. 2C shows a perspective side view of the restraint device illustrated in FIG. 2A with the first airbag filled and the second airbag filled.

The filled second airbag 65 shown in FIG. 2B is shown once again in a perspective side view in FIG. 2C. However, in the exemplary embodiment illustrated here, the first airbag 60 is additionally also filled with air. It should be noted that the first airbag 60 can be entirely or partially filled and, respectively, entirely or partially emptied independently of corresponding filling or emptying of the second airbag 65. As an alternative, it is likewise possible to make filling and, respectively, emptying of the first airbag 60 dependent on the filling state of the second airbag 65, and vice versa.

Figure 3A:
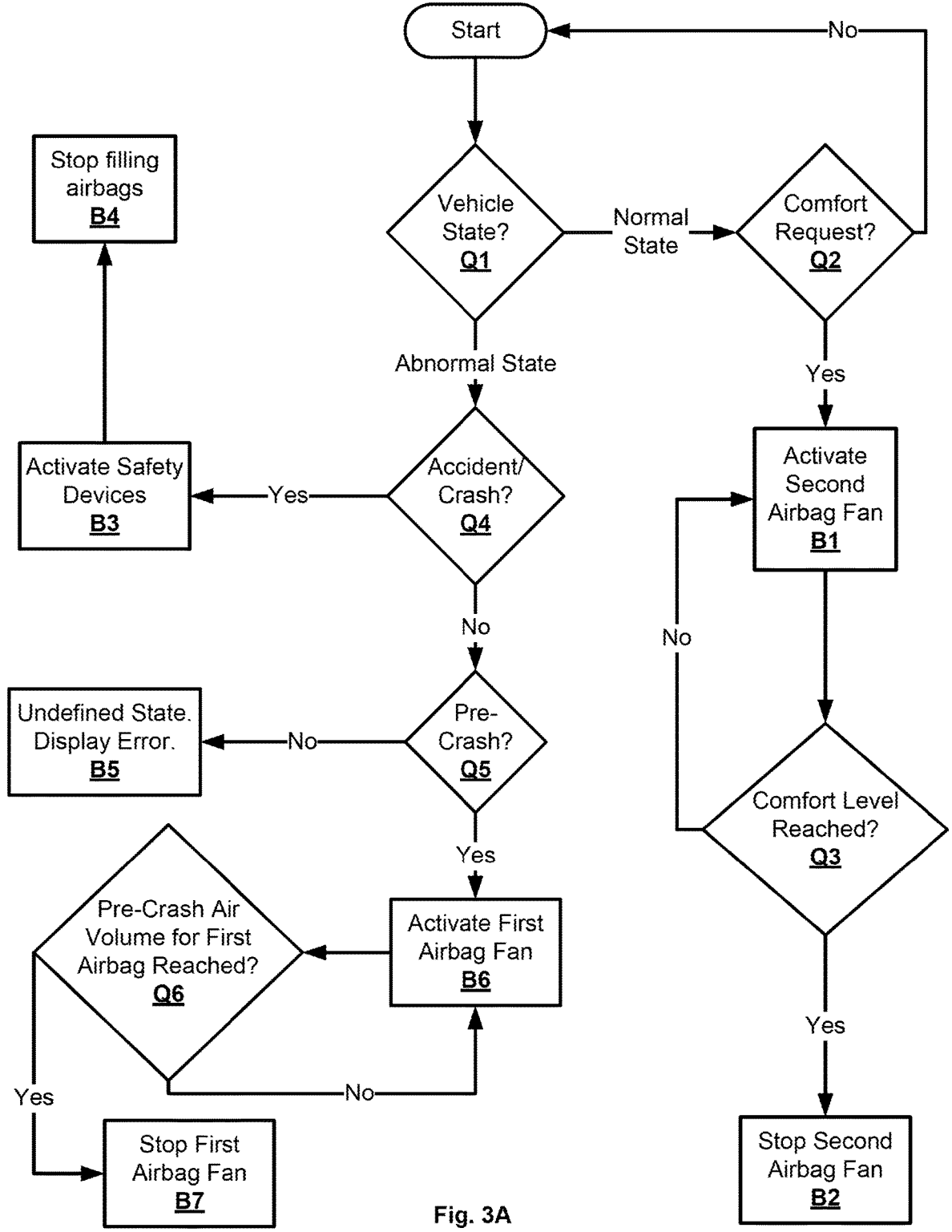
FIG. 3A is a flowchart for illustrating an embodiment of a method for filling a restraint device according to the invention.

FIG. 3A illustrates a checking routine which relates to filling the two airbags 60, 65. After the routine is started, a check is first made to determine whether the motor vehicle 10 is in a normal state—cf. Q1 in FIG. 3A. The motor vehicle 10 is in a normal state when it is undamaged and neither a pre-crash situation nor an accident situation are detected. If the motor vehicle 10 is in the normal state (identified by a plus sign in FIG. 3A), a check Q2 is made to determine whether a comfort request has been made by the vehicle occupant 70 or not. If no comfort request has been made (identified by a minus sign), the routine illustrated here returns to the start. If, however, a comfort request has been made, the fan provided for the second airbag 65 in this exemplary embodiment is activated (identified by B1 in FIG. 3A). A check Q3 to determine whether the comfort level desired by the vehicle occupant 70 has been reached is then made. If this is the case, the corresponding fan is stopped, as shown by B2 in FIG. 3A. However, if the desired comfort level has not been achieved in Q3, the fan continues to remain activated or is further activated in accordance with B1.

If the motor vehicle 10 is not in the normal state, a check Q4 to determine whether there is an accident or crash situation is made. If this is the case, accident safety devices which are located in the motor vehicle 10 are activated (B3) and the routine shown in FIG. 3A for filling the two airbags 60, 65 is stopped (B4). The accident safety device may be devices known per se from the prior art, such as belt tensioners for restraining the vehicle passenger 70 in the vehicle seat 5, head and/or side airbags (not shown), or means which stabilize or brake the motor vehicle 10 for example.

If the motor vehicle 10 is neither in the normal state nor in an accident situation, a check Q5 to determine whether the motor vehicle 10 is in a pre-crash situation is made in line with the routine. If this is not the case, the state of the motor vehicle 10 is undefined and there is an error which is output—cf. B5 in FIG. 3A. In this case, the output can be made optically and/or acoustically in a manner which is known per se, and therefore the vehicle occupant 70 can be made aware of the error message. However, if the motor vehicle 10 is in a pre-crash situation, the fan 35, 40 and/or 45 which is associated with the first airbag 60 is activated (B6). A check Q6 to determine whether the air volume intended for the first airbag 60 and defined for a pre-crash situation has been reached or not is then accordingly made in line with the routine. If this is the case, the fan which is associated with the first airbag 60 is stopped in accordance with step B7. However, if the volume of the first airbag 60 which is intended for the pre-crash situation has not yet been reached, the fan 35, 40 and/or 45 provided for said first airbag remains activated.

Figure 3B:
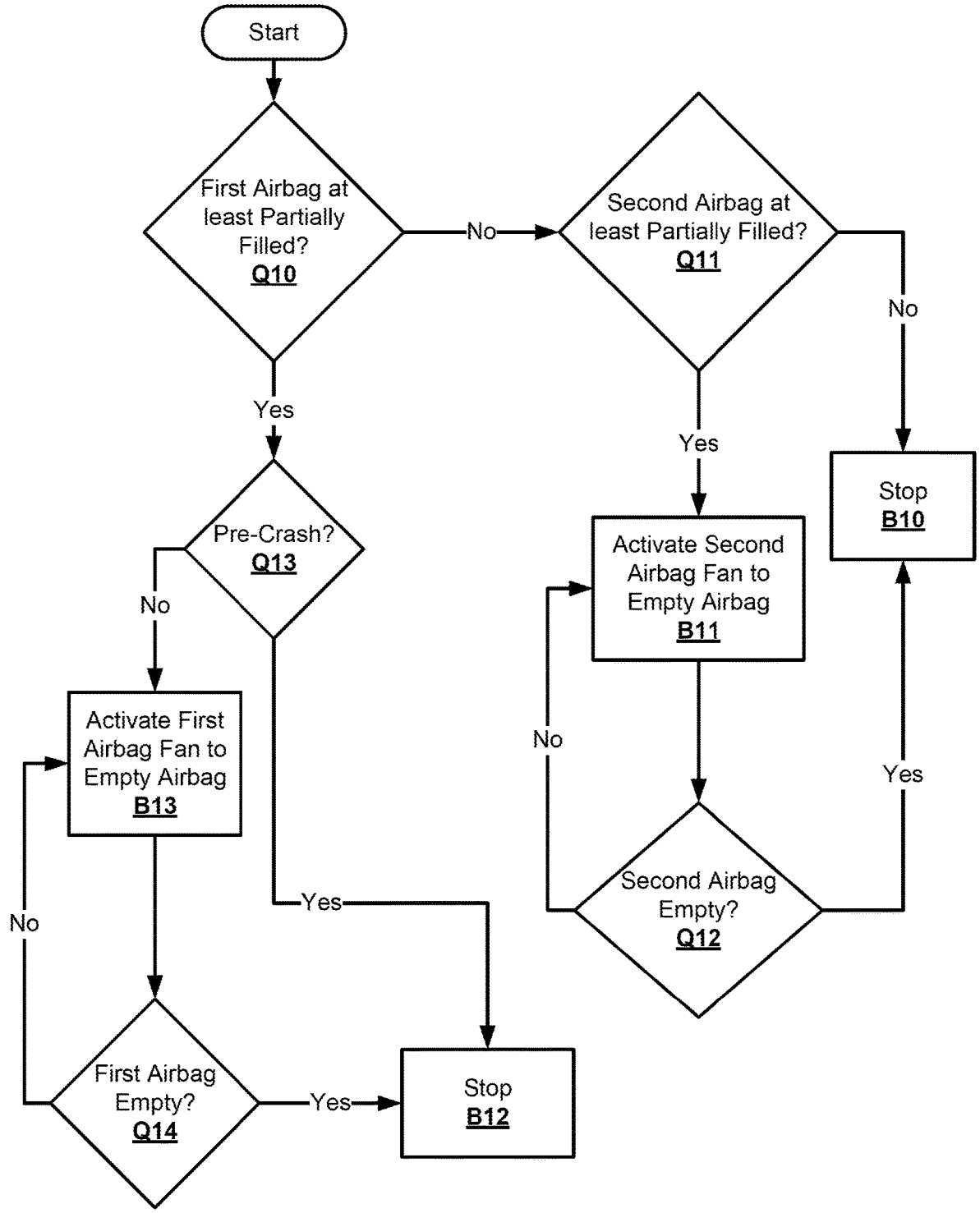
FIG. 3B is a flowchart for illustrating an embodiment of the method for emptying a restraint device according to the invention.

FIG. 3B illustrates, by way of example, a routine which defines emptying of the first airbag 60 and second airbag 65. According to this routine, a check is made in Q10 to determine whether the first airbag 60 is entirely or partially filled or not after the start of the routine. If this is not the case, a check is made in accordance with Q11 to determine whether the second airbag 65 is entirely or partially filled or not. If this is not the case, this routine can be stopped (B10). If the first airbag 60 and the second airbag 65 are entirely or partially filled, provision is made to activate the fan 35, 40 and/or 45 provided for the second airbag 65 in accordance with B11 in order to empty the second airbag, wherein the fan direction is opposite to the filling direction provided in FIG. 3A. A check is then made in Q12 to determine whether the second airbag 65 has been emptied as desired or not. If this is not the case, the corresponding fan 35, 40 and/or 45 continues to remain activated. However, if the second airbag 65 has been sufficiently emptied, the routine is stopped according to B10.

If it is established in accordance with check Q10 that the first airbag 60 is filled, a check Q13 is carried out with the objective of ascertaining a pre-crash situation. If there is actually a pre-crash situation, the routine is stopped in accordance with B12. If there is no pre-crash situation, the fan 35, 40 and/or 45 which is associated with the first airbag 60 is activated in accordance with B13. A check is made in accordance with Q14 to determine whether the first airbag 60 has been sufficiently emptied. If this is not the case, the fan 35, 40 and/or 45 which is associated with said first airbag is further activated in accordance with B13. However, if the first airbag 60 has been sufficiently emptied, the routine is stopped according to B12.

According to an alternative embodiment, the method according to the invention for operating the restraint apparatus 1 according to the invention can include, in particular, the following steps:

Checking whether a motor vehicle 10 which is provided with the restraint device 1 is in a normal state.
1.1. If said motor vehicle is in a normal state, checking whether there is a comfort request signal, an emptying request signal or a safety belt release signal.
   1.1.1. If there is a comfort request signal, filling the second airbag 65 until there is no longer a comfort request signal.
   1.1.2. If there is an emptying request signal, emptying the second airbag 65 until there is no longer an emptying request signal.
   1.1.3. If there is a safety belt release signal, emptying the second airbag 65 completely.
1.2. If there is no normal state, checking whether there is a pre-crash signal.
   1.2.1. If there is a pre-crash signal, filling the first airbag 60 completely.
   1.2.2. If there is no pre-crash signal, checking whether there is an accident signal.
      1.2.2.1. If there is an accident signal, emptying the second airbag 65 completely.
      1.2.2.2. If there is no accident signal, outputting an error message.

It goes without saying that the details of the device according to the invention and, respectively, of the method according to the invention presented above are not restrictive and are exemplary. Therefore, it is possible to combine individual above-described features and/or method steps with one another in other ways too, without departing from the disclosure of the invention.

LIST OF REFERENCE SYMBOLS

1 Restraint apparatus
5 Vehicle seat
10 Motor vehicle
15 Safety belt
20 Belt retractor
25 End fitting
30 Buckle
35 Fan
40 Fan
45 Fan
50 Lower belt
55 Upper belt
57 Airbag device
60 First airbag
65 Second airbag
70 Vehicle occupant
75 Shoulder
80 Chest
85 Pre-crash sensor
90 Input apparatus
95 First section
100 Second section
105 Head
Q1 . . . Q14 Checks
B1 . . . B13 Routine commands
+ Positive response
− Negative response The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A restraint device for a vehicle occupant, comprising:
a safety belt;
an airbag device which is arranged on the safety belt, wherein
   the airbag device has a first airbag, which is arranged on that side of the safety belt which faces the vehicle occupant,
   the airbag device has a second airbag, which is arranged on only that side of the safety belt which faces away from the vehicle occupant, the first airbag and/or the second airbag are configured so as to be fillable with air or emptiable,
at least one of the first airbag and the second airbag is coupled to a pre-crash sensor, and
only the first airbag is configured to fill in response to a signal generated by the pre-crash sensor.

2. The restraint device as claimed in claim 1, further comprising:
a first fan fluidically connected to the first airbag; and
a second fan fluidically connected to the second airbag.

3. The restraint device as claimed in claim 1, wherein
the first airbag and the second airbag are fluidically connected to a common fan.

4. The restraint device as claimed in claim 2, further comprising:
a valve device configured to selectively fill and empty the first airbag and the second airbag.

5. The restraint device as claimed in claim 3, further comprising:
a valve device configured to selectively fill or empty the first airbag and the second airbag.

6. The restraint device as claimed in claim 1, wherein
the second airbag is coupled to a manually operable input device.

7. The restraint device as claimed in claim 2, wherein
a respective fan is arranged on: (i) a belt retractor which guides the safety belt, (ii) an end fitting which holds the safety belt, and/or (iii) a buckle which holds and, respectively, releases the safety belt.

8. The restraint device as claimed in claim 3, wherein
a respective fan is arranged on: (i) a belt retractor which guides the safety belt, (ii) an end fitting which holds the safety belt, and/or (iii) a buckle which holds and, respectively, releases the safety belt.

9. The restraint device as claimed in claim 1, wherein
at least one of the first airbag and the second airbag is formed with the safety belt.

10. The restraint device as claimed in claim 1, wherein
at least one of the first airbag and the second airbag is arranged in a region of a shoulder and/or a chest of a vehicle occupant.

11. A restraint device for a vehicle occupant, comprising:
a safety belt;
an airbag device which is arranged on the safety belt, wherein
the airbag device has a first airbag, which is arranged on that side of the safety belt which faces the vehicle occupant,
the airbag device has a second airbag, which is arranged on that side of the safety belt which faces away from the vehicle occupant,
the first airbag and the second airbag are configured so as to be independently fillable with air and emptiable via a fan,
at least one of the first airbag and the second airbag is coupled to a pre-crash sensor, and
only the first airbag fills in response to a signal generated by the pre-crash sensor.

12. The restraint device as claimed in claim 11, further comprising:
a valve device configured to selectively fill and empty the first airbag and the second airbag.

13. The restraint device as claimed in claim 11, wherein
the second airbag is coupled to a manually operable input device.

14. The restraint device as claimed in claim 11, wherein
the fan is arranged on: (i) a belt retractor which guides the safety belt, (ii) an end fitting which holds the safety belt, and/or (iii) a buckle which holds and, respectively, releases the safety belt.

15. The restraint device as claimed in claim 11, wherein
at least one of the first airbag and the second airbag is formed with the safety belt.

16. The restraint device as claimed in claim 11, wherein
at least one of the first airbag and the second airbag is arranged in a region of a shoulder and/or a chest of a vehicle occupant.

* * * * *